(12) United States Patent
Shankar et al.

(10) Patent No.: US 7,515,592 B2
(45) Date of Patent: Apr. 7, 2009

(54) FAST-PATH IMPLEMENTATION FOR TRANSPARENT LAN SERVICES USING DOUBLE TAGGING

(75) Inventors: Laxman Shankar, San Jose, CA (US); Shekhar Ambe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1018 days.

(21) Appl. No.: 10/358,222

(22) Filed: Feb. 5, 2003

(65) Prior Publication Data

US 2004/0066780 A1  Apr. 8, 2004

Related U.S. Application Data

(60) Provisional application No. 60/416,252, filed on Oct. 7, 2002.

(51) Int. Cl.
*H04L 12/28* (2006.01)
*H04L 12/56* (2006.01)
(52) U.S. Cl. .............................. 370/395.31; 370/395.53
(58) Field of Classification Search ................. 370/389, 370/395.3, 395.31, 397, 399
See application file for complete search history.

(56) References Cited

U.S. PATENT DOCUMENTS

| | | | |
|---|---|---|---|
| 5,828,653 A | 10/1998 | Goss | |
| 5,831,980 A | 11/1998 | Varma et al. | |
| 5,842,038 A | 11/1998 | Williams et al. | |
| 6,061,351 A | 5/2000 | Erimli et al. | |
| 6,175,902 B1 | 1/2001 | Runaldue et al. | |
| 6,181,699 B1 * | 1/2001 | Crinion et al. | 370/392 |
| 6,249,521 B1 | 6/2001 | Kerstein | |
| 6,460,088 B1 | 10/2002 | Merchant | |
| 6,618,388 B2 * | 9/2003 | Yip et al. | 370/401 |
| 6,771,662 B1 * | 8/2004 | Miki et al. | 370/469 |
| 6,912,589 B1 * | 6/2005 | Jain et al. | 709/238 |
| 7,054,319 B2 * | 5/2006 | Akahane et al. | 370/395.53 |
| 7,072,346 B2 * | 7/2006 | Hama | 370/395.53 |
| 7,136,374 B1 * | 11/2006 | Kompella | 370/352 |
| 7,180,899 B2 * | 2/2007 | De Silva et al. | 370/395.31 |
| 2002/0167950 A1 * | 11/2002 | Chang et al. | 370/396 |

FOREIGN PATENT DOCUMENTS

EP  1045553  10/2000

* cited by examiner

*Primary Examiner*—Wing F Chan
*Assistant Examiner*—Marcus R Smith

(57) ABSTRACT

A network device for processing a packet can include an ingress port configured to receive the packet. In addition, the network device can include a membership port bit map table configured to store at least one membership port bit map, an outgoing port bit map table configured to store at least one outgoing port bit map. A first storage unit within the network device can be configured to store an egress port bit map. The egress port bit map is based on the membership port bit map and the outgoing port bit map. Furthermore, the network device can have at least one egress port configured to transmit out the packet. The at least one egress port can correspond to the egress port bit map.

38 Claims, 15 Drawing Sheets

Packet 200

Packet 210

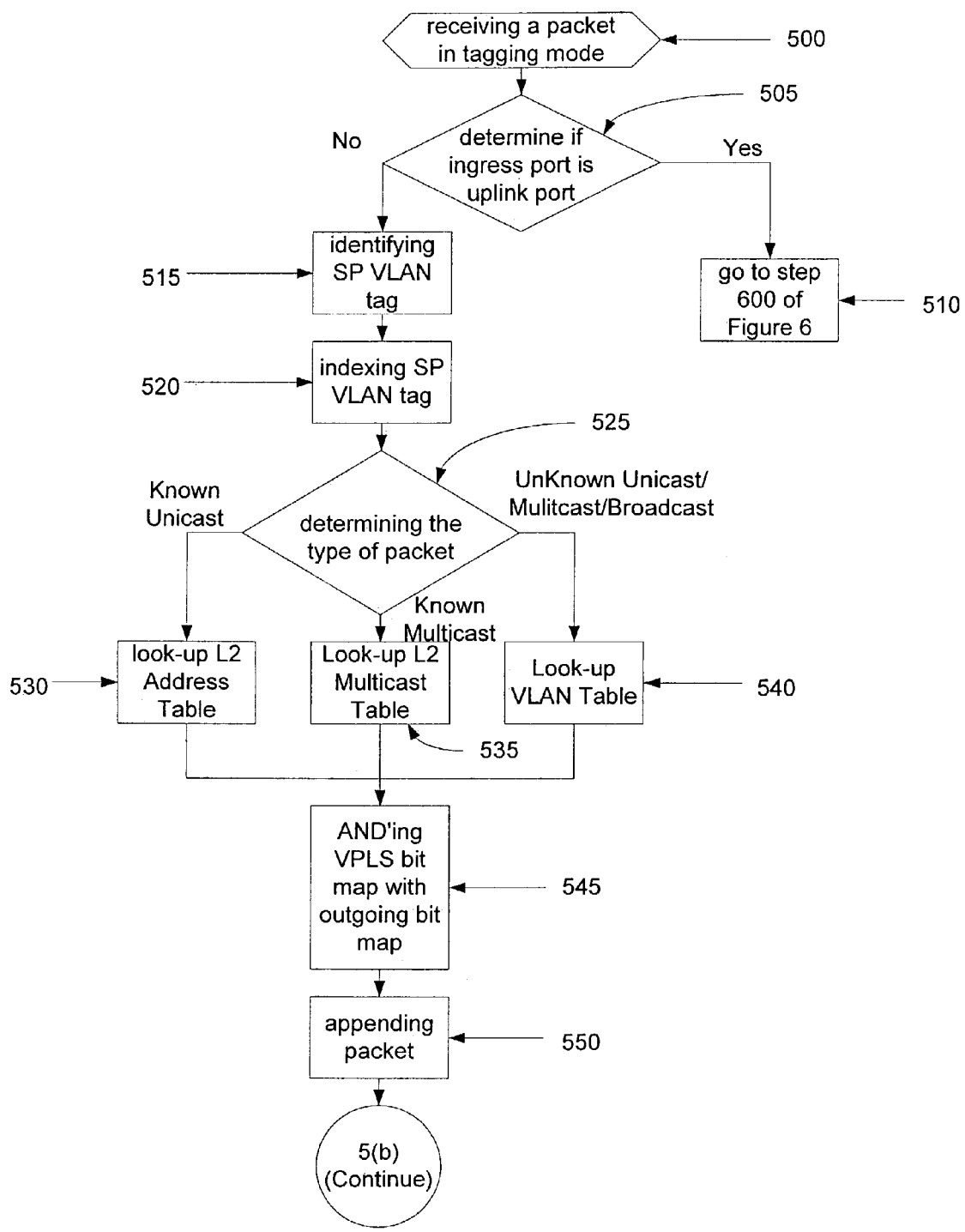

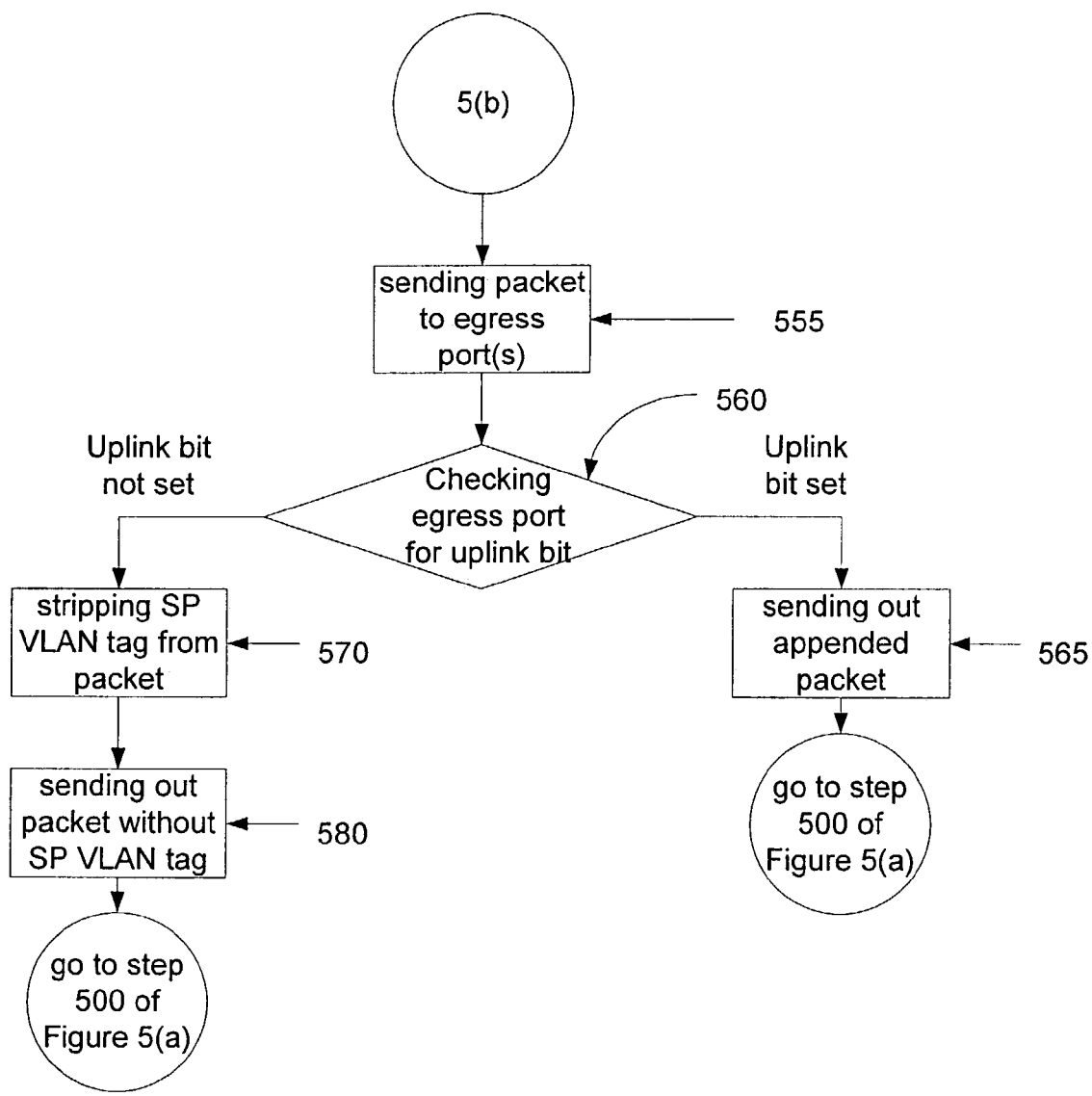

Figure 9
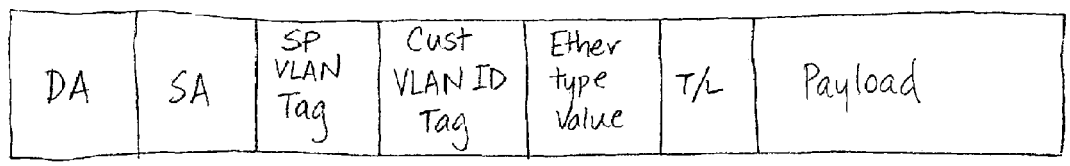
Packet 900
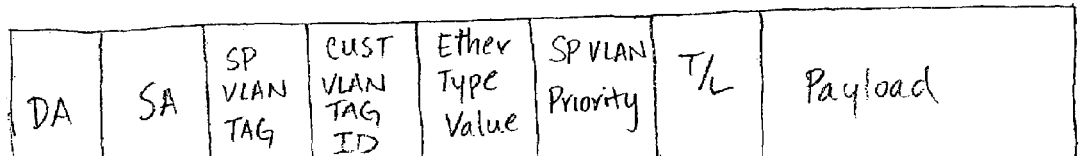
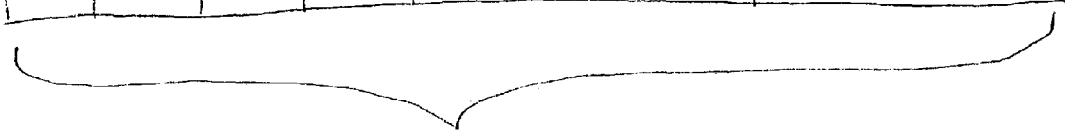
Packet 901

FAST-PATH IMPLEMENTATION FOR TRANSPARENT LAN SERVICES USING DOUBLE TAGGING

REFERENCE TO RELATED APPLICATIONS

This application claims priority of U.S. Provisional Patent Application Ser. No. 60/416,252, filed Oct. 7, 2002. The entire contents of this Provisional Application are incorporated by reference herein.

BACKGROUND OF THE INVENTION

1. Field of the Invention

The present invention relates to a method of and an apparatus for processing a packet based on double tagging a packet within a Virtual Private LAN Service (VPLS), a Transparent LAN Service (TLS), a Virtual Private Switched Network Service (VPSNS), or any Layer 2 Virtual Private Network (VPN). In essence, the present invention can be applied to any packet-based service provider communication network environment, such as token ring, ATM, Ethernet, Fast Ethernet, Gigabit Ethernet and 10 Gigabit Ethernet. In particular, the present invention relates to a method of and an apparatus for fast-path implementation for TLS using double tagging that can be implemented on a semiconductor substrate such as a silicon chip.

2. Description of the Related Art

As the popularity and usage of the Internet grows, an increasing amount of end-users are being interconnected via the Internet. In particular, business entities, such as corporations, having multiple site-offices located in different parts of the world, are increasingly relying on the Internet to communicate with each other. For instance, a corporate entity having multiple site-offices located at geographically dispersed sites may look to a fast and efficient way using the Internet to interconnect a group of private site-offices belonging to the private corporate entity together. Accordingly, there is a need to provide a fast, inexpensive and reliable system that can offer a virtual private customer-based network wherein inter-office network connections are achieved using the fast growing Internet infrastructure, especially the Internet Service Provider (ISP).

SUMMARY OF THE INVENTION

One example of the present invention can include a method for processing a packet in a communications network. The method can include the steps of receiving the packet in an ingress port within a network component, and accessing a packet tag corresponding to the packet. Furthermore, the method can include the steps of identifying a membership port bit map based on the packet tag, identifying an outgoing port bit map based on the packet, and generating an egress port bit map based on the membership port bit map and the outgoing port bit map. In addition, the method can include the step of transmitting the packet out of at least one egress port corresponding to the egress port bit map.

In another example, the present invention can relate to a network device for processing a packet. The network device can have an ingress port configured to receive the packet. In addition, the network device can have a membership port bit map table configured to store at least one membership port bit map, and an outgoing port bit map table configured to store at least one outgoing port bit map. The network device can also include a first storage unit configured to store an egress port bit map, wherein the egress port bit map is based on the membership port bit map and the outgoing port bit map, and at least one egress port configured to transmit out the packet. The at least one egress port within the network device can correspond to the egress port bit map.

Furthermore, another example of the present invention can provide a system for processing a packet in a communications network. The system can have a receiving means for receiving the packet in an ingress port within a network component, and an accessing means for accessing a packet tag corresponding to the packet. In addition, the system can have an identifying means for identifying a membership port bit map based on the packet tag, an identifying means for identifying an outgoing port bit map based on the packet, and a generating means for generating an egress port bit map based on the membership port bit map and the outgoing port bit map. Also, the system can have a transmitting means for transmitting the packet out of at least one egress port corresponding to the egress port bit map.

BRIEF DESCRIPTION OF THE DRAWINGS

For proper understanding of the invention, reference should be made to the accompanying drawings, wherein:

FIGS. 5(a) and (b) illustrate one example of a method of processing a packet based on double tagging within a TLS network system.

FIG. 9 illustrates examples of packets according to the present invention;

DETAILED DESCRIPTION OF THE PREFERRED EMBODIMENT(S)

Figure 1:
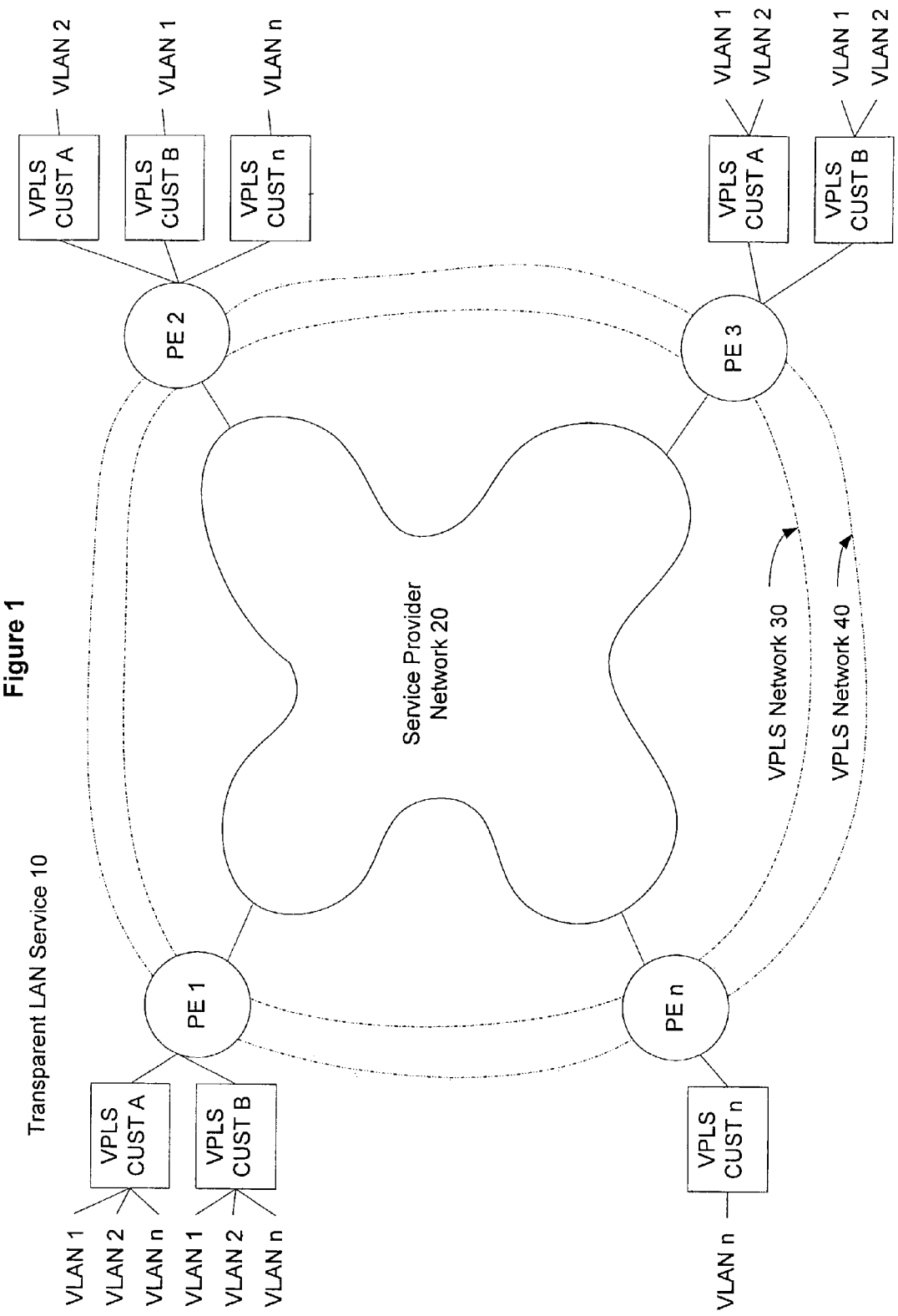
FIG. 1 illustrates one example of a Transparent LAN Service Network System in accordance with the present invention.

FIG. 1 illustrates one example of a fast-path Transparent LAN Service (hereinafter "TLS") network system 10 implementing double tagging. The TLS network system 10 of this example can be configured to deliver Ethernet service to multiple customers geographically dispersed across a network, such as a Wide Area Network (WAN) or Meto Area Network (MAN), as if the multiple customers were connected through a Local Area Network (LAN).

The TLS network system 10 as shown in FIG. 1 illustrates a Service Provider Network (SPN) 20. The SPN 20 can be a packet switched network, such as the Internet. Also shown in FIG. 1 is a plurality of Provider Edge (PE) devices PE 1, PE 2, PE 3 . . . PE n connected within the SPN 20.

In addition, FIG. 1 illustrates TLS network system 10 having two VPLS customers, VPLS CUST A and VPLS CUST B. It is noted that although FIG. 1 shows a TLS network system 10 having two VPLS customers, the present invention can be configured to handle a plurality of VPLS customers CUST n within the TLS network system 10.

Each VPLS CUST A and B can be connected to a PE device. In addition, each VPLS customer can have its own plurality of independent Virtual Local Area Networks (VLAN), VLAN 1, VLAN 2 . . . VLAN n. Accordingly, FIG. 1 shows VLAN 1, VLAN 2 . . . VLAN n of VPLS CUST A being "bridged" transparently over SPN 10, wherein a Service Provider VLAN, SP VLAN 30, can be configured to specifically carry all of VPLS CUST A's communication traffic. Similarly, FIG. 1 shows VLAN 1, VLAN 2 . . . VLAN n of VPLS CUST B being "bridged" transparently over SPN 10, wherein SP VLAN 40 can be configured to carry all of VPLS CUST B's communication traffic.

Figure 2:
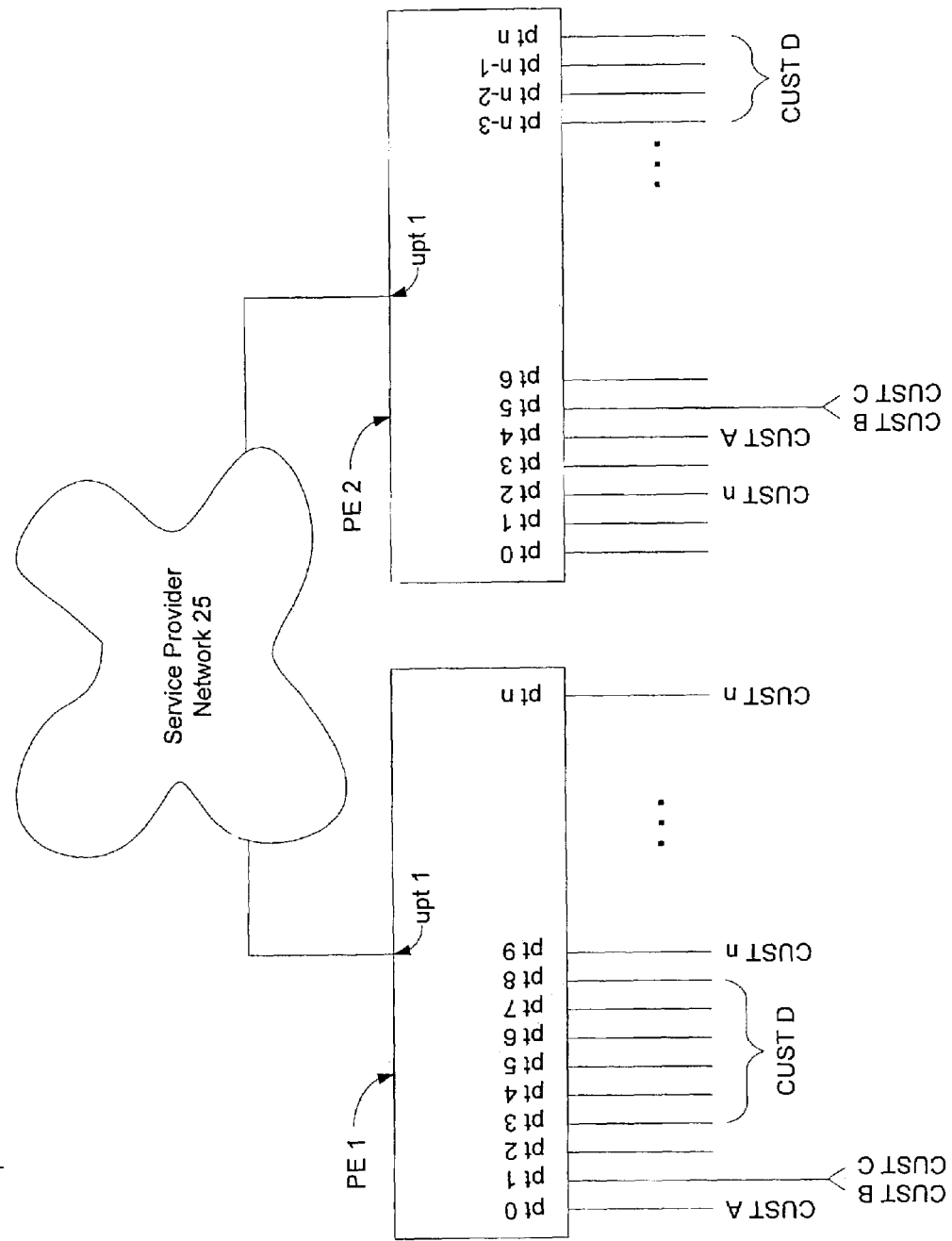
FIG. 2 illustrates another example of a Transparent LAN Service Network System in accordance with the present invention.

FIG. 2 illustrates another example of a TLS network system 15 that can include a SPN 25 and PE devices PE 1 and PE 2. Each PE device can be configured to have a plurality of ports, such as at least one uplink port, upt 1 and one or more customer facing port(s), pt 0, pt 1 . . . pt n. Each port within each of the PE devices can be configured to be a receiving port, or an ingress port, as well as a transmitting port, or an egress port, for receiving and transmitting a packet, respectively. Although the TLS network system 10, 15 of the present example can manage data and/or information in the form of a packet, it is noted that in other examples of the present invention, the TLS network system 10, 15 can be configured to also manage data and/or information in other formats, such as a data frame, or a data cell. Therefore, any reference to a packet herein can also refer to at least a frame, a cell, or a data packet, a data frame or a data cell.

Further shown in FIG. 2, each port within the PE devices can be organized into groups of port(s) for one or more customer(s), wherein each organized group of port(s) can represent a VPLS domain for the TLS network system 15. According to FIG. 2, a specific customer can be provided with one or more port(s) from the PE device. As such, each port from within the organized group of port(s) assigned to the specific customer can be designated to connect with each and every VLAN of that particular customer, or selected VLANs. It is noted that one or more customer(s) can share the same organized group of port(s) from the PE device if each customer share the same set of unique VLAN IDs.

For instance, FIG. 2 shows PE devices PE 1 and PE 2 connected to a SPN 25 via an uplink port upt1, wherein PE 1 and PE 2 can be two geographically dispersed sites. PE 1 and PE 2, each has a plurality of ports pt 0, pt 1, pt 2, pt 3 . . . pt n therein. Port pt 0 of PE 1 is designated for VPLS CUST A only. Port pt 1 of the same PE device however is designed for two customers, them being VPLS CUST B and C. Furthermore, ports pt 3, pt 4, pt 5, pt 6, pt 7 and pt 8, are organized as a group of ports for VPLS CUST D. As for PE 2, port pt 4 is designated for VPLS CUST A and port pt 5 is designated to both VPLS CUST B and C. Also, ports pt n−3, pt n−2, pt n−1 and pt n, are organized as a group of ports for VPLS CUST D.

Figure 3:
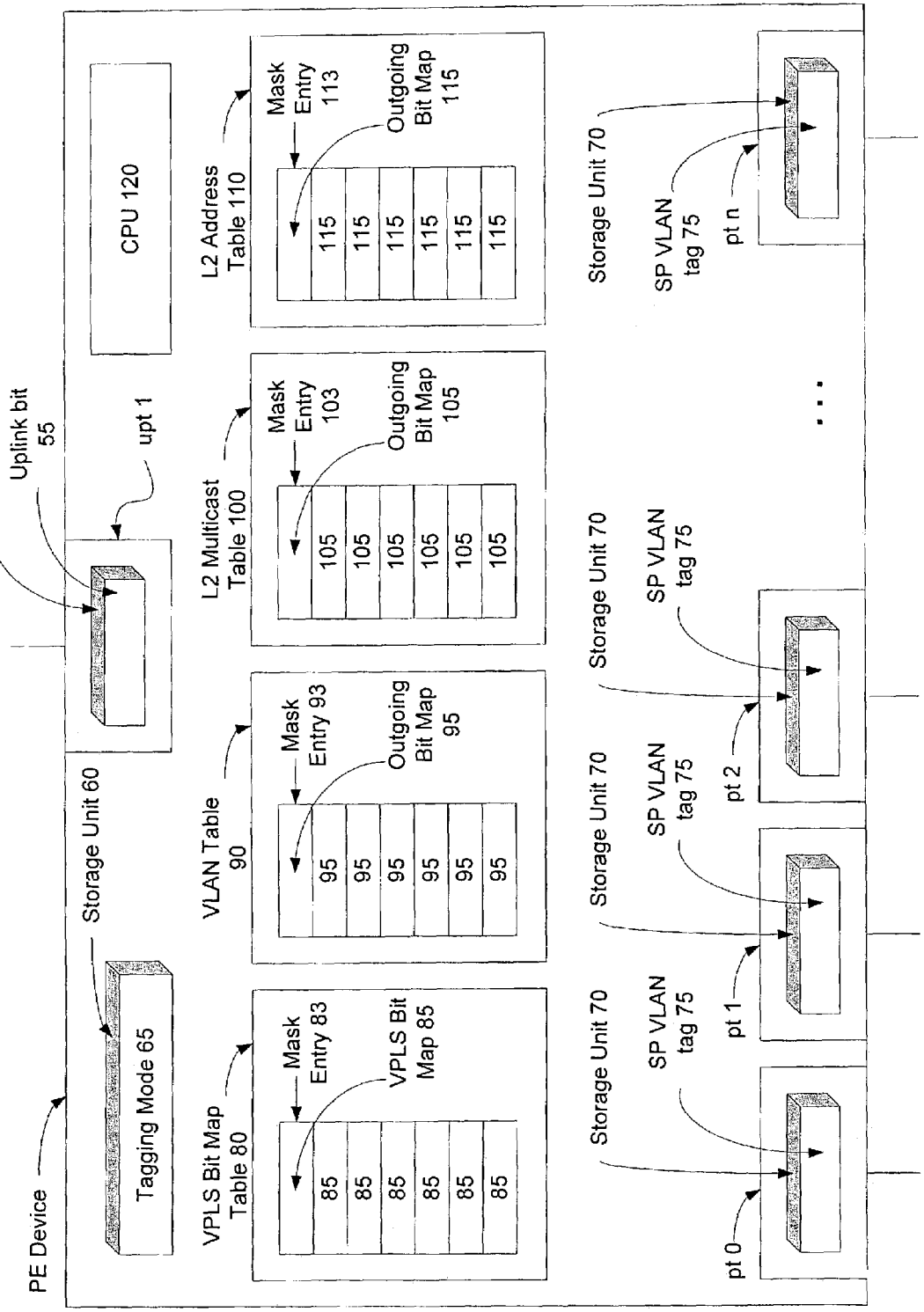
FIG. 3 illustrates one example of a Provider Edge Device in accordance with the present invention.

FIG. 3 illustrates one example of a hardware configuration of a PE device, such as PE 1, PE 2 . . . PE n. The hardware configuration of FIG. 3 can be in an integrated, modular and single chip solution, and therefore can be embodied on a semiconductor substrate, such as silicon. Alternatively, the hardware configuration of FIG. 3 can be embodied in a plurality of discrete components on a circuit board.

The PE device can be configured to include at least one uplink port upt 1, and a plurality of customer facing ports or subscriber ports, pt 0, pt 1, pt 2 . . . pt n. As mentioned above, each port within the PE devices can be configured to be a receiving port, or an ingress port, as well as a transmitting port, or an egress port, for receiving and transmitting a packet, respectively.

FIG. 4(*a*) illustrates one example of a packet 200 that can be received in or transmitted out of any one of the customer facing ports or subscriber ports pt 0, pt 1, pt 2 . . . pt n. The packet 200 can be configured to include, at least a destination address field DA, a source address field SA, a customer VLAN identification tag VLAN ID, a type or length field T/L, and a payload P.

The destination address field can be a bit value that can be used by the receiving Media Access Controller (MAC), in order to determine if the incoming packet is addressed to the particular port. There can typically be three types of destination addresses i) unicast/individual or physical DA, ii) multicast or logical DA and iii) broadcast DA. The source address field can be a bit value and can be supplied by the transmitting MAC, which can inserts its own unique address into the source address field as the frame is transmitted, indicating it was the original station. The receiving MAC is not required to take action based on the source address field. Furthermore, the customer VLAN ID tag is a first packet tag inserted within the packet. The VLAN ID tag can identify a particular VLAN for a unique customer. In other words, if a customer has a plurality of VLANs, such as VLAN 1, VLAN . . . VLANn, the customer VLAN ID tag can identify the packet as originating from one of the customer's VLANs. The T/L field can provide the type or the length of the packet. The payload P can contain the actual frame data that is being transferred.

FIG. 4(*b*) illustrates one example of a packet 210 that can be received in or transmitted out of any one of an uplink port upt 1. The packet 210 can be configured to include, at least a destination address field DA, a source address field SA, a SP VLAN tag, a customer VLAN identification tag VLAN ID, a type or length field T/L, and a payload P.

Packet 210 can include a SP VLAN tag, which can be a second tag in the packet 210. SP VLAN tag can specify or identify a customer within the TLS network system 10. In other words, if a TLS network system 10 includes a plurality of customers, such as VPLS CUST A, VPLS CUST B, VPLS CUST C, and VPLS CUST D, the SP VLAN tag can identify the packet as originating from and belonging to a particular VPLS customer.

Therefore, packet 210 can include at least a first tag, that being a customer VLAN tag, and a second tag, that being a SP VLAN tag. The SP VLAN tag can identify the packet as belonging to a particular VPLS customer, and the VLAN tag can identify the particular VLAN belonging to that VPLS customer. Accordingly, a packet having a first and second tag can always be identified as belonging to a unique VPLS customer, even if a plurality of the VPLS customer have overlapping or common VLAN IDs.

As mentioned above, the uplink port upt 1 of FIG. 3 can include a storage unit 50, such as a register. The storage unit 50 can be configured to store a one-bit uplink bit 55. The uplink bit 55 can either be set or not set by various way, such as preprogramming. For example, the uplink bit 55 can have either the value of "1" which sets the uplink bit 55, or the value of "0" which un-set the unlink bit. When the uplink bit 55 is set, then the port corresponding to the uplink bit can be configured to be an uplink port to the SPN 20. It is noted that each and every port within a PE device can be configured to include a storage unit 50 having an uplink bit 55 therein. Accordingly, a PE device of the present invention can have a plurality of uplink ports when a plurality of uplink bits are set.

Also shown in FIG. 3, the PE device can include a storage unit 60, such as a register, wherein the storage unit 60 can be configured to store information or instruction in any format to indicate that the PE device is operating under tagging mode 65. For instance, the storage unit 60 can be configured to store a one-bit tagging mode 65, whereby a bit value of "1" can indicate that the PE device is operating under tagging mode, and whereby a bit value of "0" can indicate that the PE device is not operating under tagging mode.

As mentioned above, the PE device of FIG. 3 can include a plurality of customer ports, pt 0, pt 1, pt 2 . . . pt n. Each port can be configured to include a storage unit 70. The storage unit 70 can be a register or any memory storage device to store data or information. In this example, the storage unit 70 can store a SP VLAN tag 75 therein. The SP VLAN tag 75 can be configured to identify one or more customer(s) that is designated for the corresponding port. The SP VLAN tag 75 can be represented by various data format. For example, the SP VLAN tag 75 can be a bit string having thirty-two bits in length, wherein the SP VLAN tag 75 specifies one single customer within the TLS network system 10. Accordingly, when a packet is received within a port of a PE device the packet received can be associated with a particular customer within the TLS network system 10 based on the SP VLAN tag 75 stored within the receiving port.

Furthermore, the PE device of FIG. 3 can be configured to include a plurality of table, such as a VPLS bit map table 80, a VLAN table 90, an L2 multicast table 100, and an L2 address look-up table 110.

The VPLS bit map table 80 can be indexed by a SP VLAN tag 75 so that one or more preprogrammed mask entries 83 therein may be accessed. Each mask entry 83 can be configured to be a VPLS bit map 85 or a membership port bit map. The VPLS bit map 85 can be a bit string having a bit length that can be equal, for example, to a number of ports with the PE device. Each bit position of the VPLS bit map 85 can correspond to a particular port within the PE device. In essence, the VPLS bit map 85 can be configured to identify a group of one or more port(s) that correspond or belong to a particular VPLS membership for that PE device. In other words, the VPLS bit map 85 can identify a group of one or more port(s) to which an unique customer's VLAN(s) can be mapped. Accordingly, each bit position of the VPLS bit map 85 can be set with a value or condition of either "1" or "0". By setting a bit position within the VPLS bit map 85 with a value or condition of "1", the port corresponding to the bit position can be included as part of the group of port(s) associated with the VPLS membership. In the alternative, by setting a bit position within the VPLS bit map 85 with a value or condition of "0", the port corresponding to the bit position can be excluded from the group of port(s) associated with the VPLS membership.

Suppose, for example, a packet 200 as shown in FIG. 4(*a*) is received in an ingress port pt 0 of a PE device. Upon receipt of the packet, an SP VLAN tag 75 corresponding to the ingress port pt 0 can be identified and accessed. The identified SP VLAN tag 75 is accessed and thereafter indexed into the VPLS bit map table 80. Upon indexing the SP VLAN tag 75, a VPLS mask entry 83 can be identified and the corresponding VPLS bit map 85 therein can also be identified. Therefore, the identified VPLS bit map 85 can provide a group of port(s) for the PE device, that belongs to a particular VPLS membership.

FIG. 3 also shows a VLAN table 90 within a PE device. The VLAN table 90 can include one or more preprogrammed mask entries 93 therein. Each mask entry 93 can be configured to be an outgoing port bit map 95. The outgoing bit map 95 can be a bit string having any bit length. Each bit position of the outgoing bit map 95 can correspond to a particular port within the PE device for a particular VLAN. In essence, the outgoing bit map 95 can be configured to identify one or more outgoing port(s) with respect to a particular VLAN. Accordingly, each bit position of the outgoing bit map 95 can be set with a value or condition of either "1" or "0". By setting a bit position within the outgoing bit map 95 with a value or condition of "1", the port corresponding to the bit position can be identified or specified as an outgoing port associated with a particular customer VLAN. In the alternative, by setting a bit position within the outgoing bit map 95 with a value or condition of "0", the port corresponding to the bit position can be identified or specified as not being an outgoing port of a particular customer VLAN.

The VLAN table 90 can be indexed by the VLAN ID tag within the packet 200 of FIG. 4(*a*). Upon receiving the packet in an ingress port, the VLAN ID can be identified and indexed into the VLAN table 90, wherein one VLAN entry having an outgoing port bit map can be identified.

FIG. 3 also shows an L2 Multicast table 100 within a PE device. The L2 Multicast table 100 can include one or more preprogrammed mask entries 103 therein, and the size of the L2 Multicast table 100 can equal to the number of multicast groups supported by the PE device. In addition, each mask entry 103 within the L2 Multicast table 100 can be accessed or looked-up by using the customer VLAN ID and the multicast DA within the packet received.

Each mask entry 103 within the L2 Multicast table 100 can be configured to be an outgoing port bit map 105 which can be a list of ports which maps to an L2 Multicast group. The L2 Multicast table 100 can be used to flood multicast packets to only those ports which have memberships of the L2 multicast group. In other words, rather than flooding a packet to the entire group of ports belonging to a particular VLAN, each outgoing port bit map 105 within the L2 Multicast table can be used to flood a packet to only the ports having membership of the L2 multicast group.

The outgoing bit map 105 within the L2 Multicast table 100 can be a bit string having any bit length. Each bit position of the outgoing bit map 105 can correspond to a particular port within the PE device having an L2 multicast membership. In essence, the outgoing bit map 105 can be configured to identify one or more outgoing port(s) with respect to a particular L2 multicast group. Accordingly, each bit position of the outgoing bit map 105 can be set with a value or condition of either "1" or "0". By setting a bit position within the outgoing bit map 105 with a value or condition of "1", the port corresponding to the bit position can be identified or specified as an outgoing port associated with a particular L2 multicast membership with respect to the packet received. In the alternative, by setting a bit position within the outgoing bit map 105 with a value or condition of "0", the port corresponding to the bit position can be identified or specified as not being an outgoing port of a particular L2 multicast group with respect to the packet received.

Furthermore, FIG. 3 shows an L2 Address table 110 within a PE device. The L2 Address table 110 can include one or more preprogrammed mask entries 113 therein. In addition, each mask entry 113 within the L2 Address table 110 can be accessed or looked-up by using the customer VLAN ID and the DA within the packet received.

Each mask entry 113 within the L2 Address table 110 can be configured to be an outgoing port bit map 115. The outgoing bit map 115 within the L2 Address table 110 can be a bit string having any bit length. Each bit position of the outgoing bit map 115 can correspond to a port within the PE device. In essence, the outgoing bit map 115 can be configured to identify one or more outgoing port(s) with respect to a packet received. Similar to above, each bit position of the outgoing bit map 115 can be set with a value or condition of either "1" or "0". By setting a bit position within the outgoing bit map 115 with a value or condition of "1", the port corresponding to the bit position can be identified or specified as an outgoing port with respect to the packet received. In the alternative, by setting a bit position within the outgoing bit map 105 with a value or condition of "0", the port corresponding to the bit position can be identified or specified as not being an outgoing port with respect to the packet received.

The PE device of FIG. 3 can also include a CPU 120. The CPU 120 can be configured to implement a plurality of tasks and operations.

FIGS. 5(a) and 5(b) illustrate one example of a method of processing a packet based on double tagging thereof in accordance with the present invention. The method of the present example can be implemented in hardware, or software, or a combination of both hardware and software.

The example as shown in FIGS. 5(a) and 5(b) can be directed to a method of processing a packet based on double tagging, wherein the packet is received on an ingress port other than an uplink port upt 1, and wherein the double tagging mode 65 within storage unit 60 is set.

Step 500 of FIG. 5(a) can receive a packet within an ingress port of a PE device. Upon receiving a packet in one of a plurality of ingress ports, pt 0, pt 1, pt 2 . . . pt n within the PE device, step 505 can determine whether the receiving ingress port is identified as an uplink port. At this step, the present invention can access a storage unit 50 within the ingress port where the packet was received. The storage unit 50 can store an uplink bit 55 therein, and the uplink bit 55 can be checked to determine whether the uplink port 55 corresponding to the ingress port is set or not set. If the uplink bit 55 corresponding to the ingress port is set, then step 510 of the present example can go to step 600 of FIG. 6(a). If however upon checking the uplink bit 55 that the uplink bit 55 is not set, then step 515 can access a storage unit 70 within the ingress port in which the packet was received. Step 515 further identifies a SP VLAN tag 75 stored within the storage unit 70. Upon identifying the SP VLAN tag 75 that corresponds to the ingress port, step 520 can index the SP VLAN tag 75 into a VPLS bit map table 80 to identify a VPLS bit map 85 or a membership port bit map stored therein.

At step 525, the present invention can determine whether the packet received is either a known unicast packet, a known multicast packet, or an unknown unicast/multicast/broadcast packet.

A known unicast packet can be a packet that is relayed or transmitted to only one known destination port. In contrast, a known multicast packet can be a packet that is relayed or transmitted to a multiple known destination ports. Moreover, an unknown unicast/multicast/broadcast packet can be a destination-lookup-failure packet. In other words, a received packet can be an unknown unicast/multicast/broadcast packet due to a failure in the destination address (DA) lookup for the packet received. Therefore, if the destination address lookup is not successful, then the destination port or ports with respect to the packet received is unknown.

Accordingly, if step 525 determines that the packet received is a known unicast packet, then step 520 of this example can access a destination address field and a customer VLAN ID tag from within the packet received, wherein a unicast destination address and a VLAN ID can be identified with respect to the packet. Furthermore, the identified unicast destination address and the VLAN ID can be used to index into an L2 Address table 110 and look-up an outgoing port bit map 115 therein at step 530 of FIG. 5(a). The identified outgoing port bit map 115 can indicate one outgoing port.

If however step 525 determines that the packet received is a known multicast packet, then step 535 of this example can access a destination address field and a customer VLAN ID tag from within the packet received, wherein a multicast destination address and a VLAN ID can be identified with respect to the packet. Furthermore, the identified multicast destination address and the VLAN ID can be used to index into an L2 Multicast table 100 and look-up an outgoing port bit map 105 therein at step 535. In contrast to the outgoing port bit map 115, the identified outgoing port bit map 105 within the L2 Multicast table 100 can indicate a plurality of outgoing ports.

Moreover, if step 525 determines that the packet received is either an unknown unicast packet, an unknown multicast packet, or an unknown broadcast packet, then step 540 can access a customer VLAN ID tag within the packet received, wherein a VLAN ID can be identified with respect to the packet. Since the destination address with respect to the packet is unknown, step 540 can only use the VLAN ID to index into a VLAN table 90 and look-up an outgoing port bit map 95 therein at step 540. The outgoing port bit map 95 within the VLAN table 90 can indicate a plurality of outgoing ports associated with the VLAN ID.

Upon identifying a VPLS bit map 85 in step 520 and identifying an outgoing port bit map 115, 105 or 95 in steps 530, 535 or 540, respectively, step 545 can compare the VPLS bit map 85 with an outgoing port bit map 115, 105, or 95 depending on the packet received. In comparing the VPLS bit map 85 with an outgoing port bit map 115, 105, or 95, the present example can perform a logical AND operation between the two bit maps. The operation of AND'ing the identified VPLS bit map 85 and an identified outgoing port bit map 115, 105, or 95 can result in an egress port bit map. The egress port bit map can be a bit string having any bit length, wherein each bit position within the egress port bit map can correspond to a particular egress port within the PE device. The egress port bit map can identify or specify one or more egress port(s) to send or transmit out the packet received. In other words, the egress port bit map can identify or specify the one or more port(s) belonging to a VPLS CUST as well as belonging to one or more VLAN(s) of that particular VPLS CUST, for the PE device.

Figure 4A:
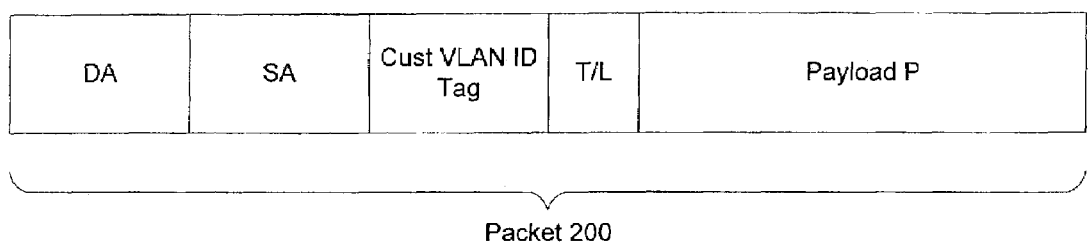
FIG. 4(a) illustrates one example of a packet inserted with a customer VLAN ID tag.
Figure 4B:
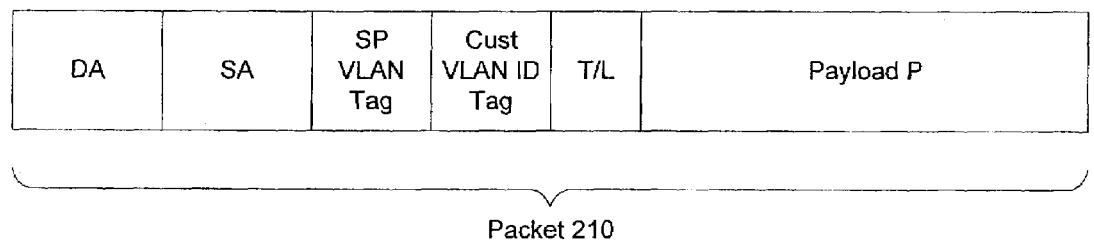
FIG. 4(b) illustrates one example of a packet inserted with a customer VLAN ID tag and a SP VLAN tag.

Once an egress port bit map is generated in step 545, step 550 can append the packet received with the identified SP VLAN tag 75 stored within the storage unit 70 of the ingress port. FIG. 4(b) illustrates one example of a packet 210 appended with a SP VLAN tag 75. Upon appending the packet received, step 555 of FIG. 5(b) can send or forward the packet 210 to one or more egress port(s) indicated or specified by the egress port bit map.

When the packet 210 arrives at one or more egress port(s) indicated by the egress port bit map, each egress port can check if there is a corresponding uplink bit 55 stored within a storage unit 50 at step 560 of FIG. 5(b). If an egress port contains a storage unit 50 having an uplink bit 55, then step 560 can further check whether the uplink bit is set or not set. If the uplink bit is set at step 560, then the egress port can send or transmit the packet 210 with the appended SP VLAN tag 75 out of the PE device at step 565.

If however an egress port does not contain a storage unit 50 having an uplink bit 55 and/or if the uplink bit 55 is not set, then step 570 can strip or remove the SP VLAN tag 75 from the appended packet 210. FIG. 4(a) illustrates one example of a packet 200 where the SP VLAN tag has been stripped or removed. Upon stripping or removing the SP VLAN tag 75 from the appended packet 210, the egress port can send or transmit the packet 200 without the SP VLAN tag 75 out of the PE device at step 580.

Figure 6A:
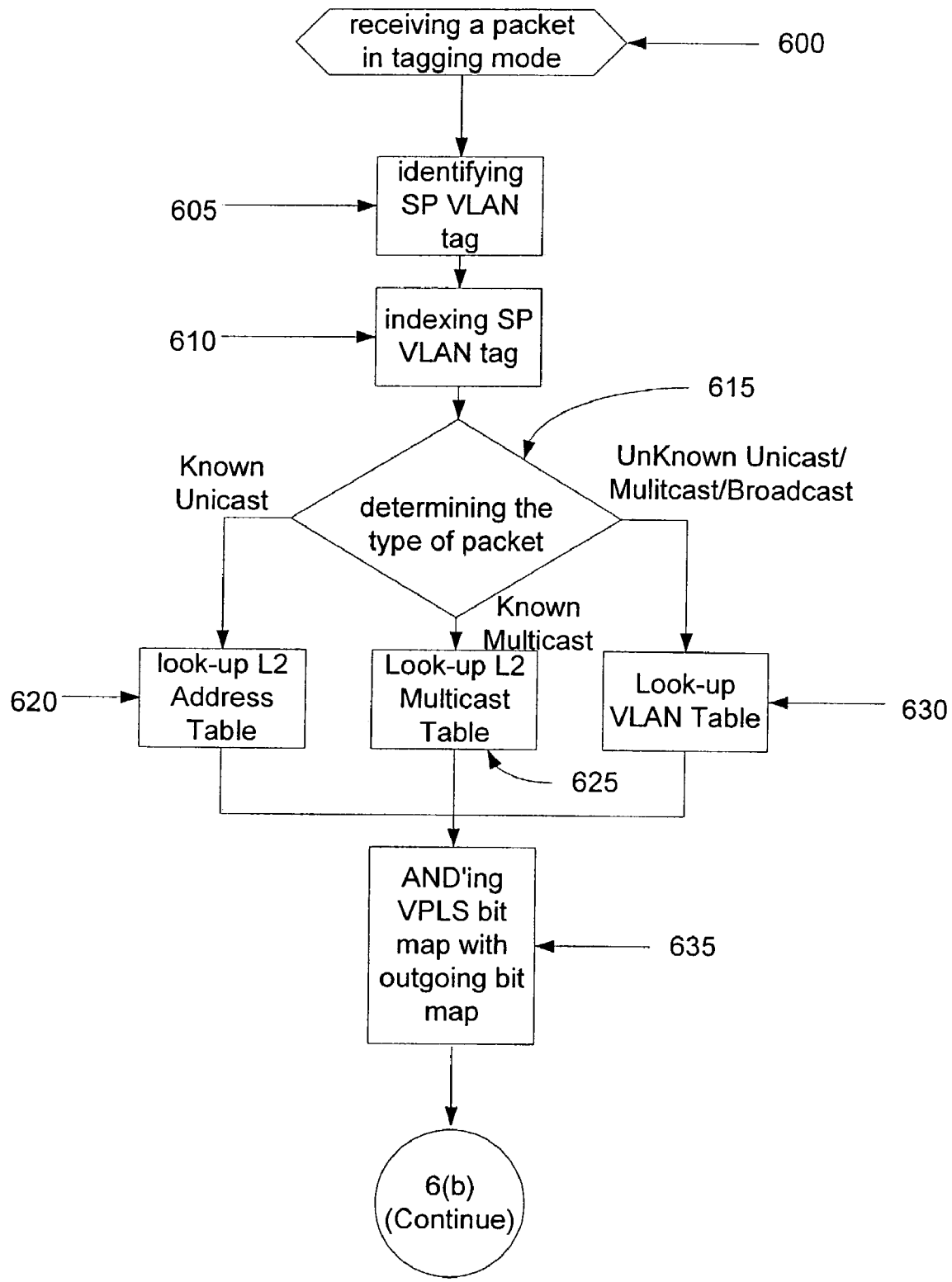
FIGS. 6(a) and (b) illustrate another example of a method of processing a packet based on double tagging within a TLS network system.
Figure 6B:
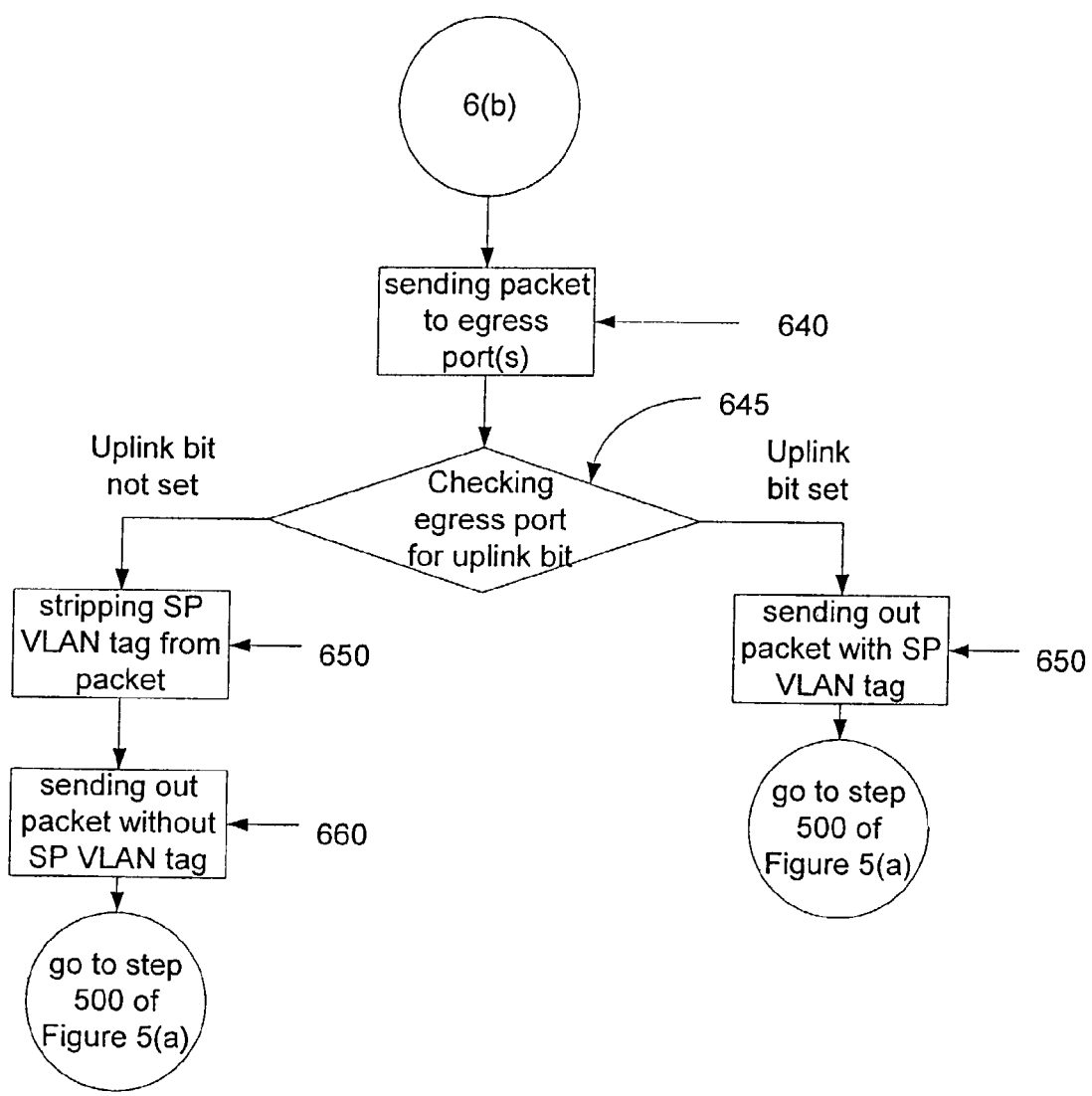

FIGS. 6(a) and 6(b) illustrate one example of a method of processing a packet based on double tagging thereof in accordance with the present invention. The method of the present example can be implemented in hardware, or software, or a combination of both hardware and software.

Similar to the example shown in FIGS. 5(a) and 5(b), the example as shown in FIGS. 6(a) and 6(b) can be directed to a method of processing a packet based on double tagging, wherein the packet is received in an ingress uplink port upt 1, and wherein the double tagging mode 65 within storage unit 60 is set.

Step 600 of FIG. 6(a) can also receive a packet within an ingress port of a PE device, wherein the ingress port is an uplink port upt 1. Upon receiving a packet in the uplink port upt 1 within the PE device, the present invention can access and identify a SP VLAN tag 75 within the packet received 210 at step 605. Upon identifying the SP VLAN tag 75 within the packet, step 610 can index the SP VLAN tag 75 into a VPLS bit map table 80 to identify a VPLS bit map 85 or a membership port bit map stored therein.

In a manner similar to step 525 of FIG. 5(a), step 615 of FIG. 6(a) of the present example can also determine whether the packet received is either a known unicast packet, a known multicast packet, or an unknown unicast/multicast/broadcast packet.

As mentioned above, a known unicast packet can be a packet that is relayed or transmitted out to only one known destination port. In contrast, a known multicast packet can be a packet that is relayed or transmitted out to a multiple known destination ports. Moreover, an unknown unicast/multicast/broadcast packet can be a destination-lookup-failure packet. In other words, a received packet can be an unknown unicast/multicast/broadcast packet due to a failure in the destination address (DA) lookup for the packet received. Therefore, if the destination address lookup is not successful, then the destination port or ports with respect to the packet received is unknown.

Although in this example, the packet is received within an uplink port, the steps in determining the outgoing bit map is similar in the manner of determining an outgoing bit map as discussed above. Accordingly, if step 615 determines that the packet received is a known unicast packet, then step 620 of this example can access a destination address field and a customer VLAN ID tag from within the packet received, wherein a unicast destination address and a VLAN ID can be identified with respect to the packet. Furthermore, the identified unicast destination address and the VLAN ID can be used to index into an L2 Address table 110 and look-up an outgoing port bit map 115 therein at step 620 of FIG. 6(a). The identified outgoing port bit map 115 can indicate one outgoing port.

If however step 615 determines that the packet received is a known multicast packet, then step 625 of this example can access a destination address field and a customer VLAN ID tag from within the packet received, wherein a multicast destination address and a VLAN ID can be identified with respect to the packet. Furthermore, the identified multicast destination address and the VLAN ID can be used to index into an L2 Multicast table 100 and look-up an outgoing port bit map 105 therein at step 625. In contrast to the outgoing port bit map 115, the identified outgoing port bit map 105 within the L2 Multicast table 100 can indicate a plurality of outgoing ports.

Moreover, if step 615 determines that the packet received is either an unknown unicast packet, an unknown multicast packet, or an unknown broadcast packet, then step 630 of FIG. 6(a) can access a customer VLAN ID tag within the packet received, wherein a VLAN ID can be identified with respect to the packet. Since the destination address with respect to the packet is unknown, step 630 can only use the VLAN ID to index into a VLAN table 90 and look-up an outgoing port bit map 95 therein at step 630. The outgoing port bit map 95 within the VLAN table 90 can indicate a plurality of outgoing ports associated with the VLAN ID.

Upon identifying a VPLS bit map 85 in step 610 and identifying an outgoing port bit map 115, 105 or 95 in steps 620, 625 or 630, respectively, step 635 can compare the VPLS bit map 85 with an outgoing port bit map 115, 105, or 95 depending if the packet received is a known unicast, a known multicast, or a unknown unicast/multicast/broadcast packet. In comparing the VPLS bit map 85 with an outgoing port bit map 115, 105, or 95, the present example can perform a logical AND operation between the two bit maps. The operation of AND'ing the identified VPLS bit map 85 and an identified outgoing port bit map 115, 105, or 95 can result in an egress port bit map. The egress port bit map can be a bit string having any bit length, wherein each bit position within the egress port bit map can correspond to a particular egress port within the PE device. The egress port bit map can identify or specify one or more egress port(s) to send or transmit out the packet received. In other words, the egress port bit map can identify or specify the one or more port(s) belonging to a VPLS CUST as well as belonging to one or more VLAN(s) of that particular VPLS CUST, for the PE device.

Once an egress port bit map is generated in step 635 of FIG. 6(a), step 640 of FIG. 6(b) can send or forward the packet 210 to one or more egress port(s) indicated or specified by the egress port bit map. When the packet 210 arrives at one or more egress port(s) indicated by the egress port bit map, each egress port can check if there is a corresponding uplink bit 55 stored within a storage unit 50 at step 645. If an egress port contains a storage unit 50 having an uplink bit 55, then step 645 can further check whether the uplink bit is set or not set. If the uplink bit is set at step 645, then the egress port can send or transmit the packet 210 with the appended SP VLAN tag 75 out of the PE device at step 650.

If however an egress port does not contain a storage unit 50 having an uplink bit 55 and/or if the uplink bit 55 is not set therein, then step 655 can strip or remove the SP VLAN tag 75 from the appended packet 210. FIG. 4(a) illustrates one example of a packet 200 where the SP VLAN tag 75 has been stripped or removed therefrom. Upon stripping or removing the SP VLAN tag 75 from the appended packet 210, the egress port can send or transmit the packet 200 without the SP VLAN tag 75 out of the PE device at step 660.

Figure 7:
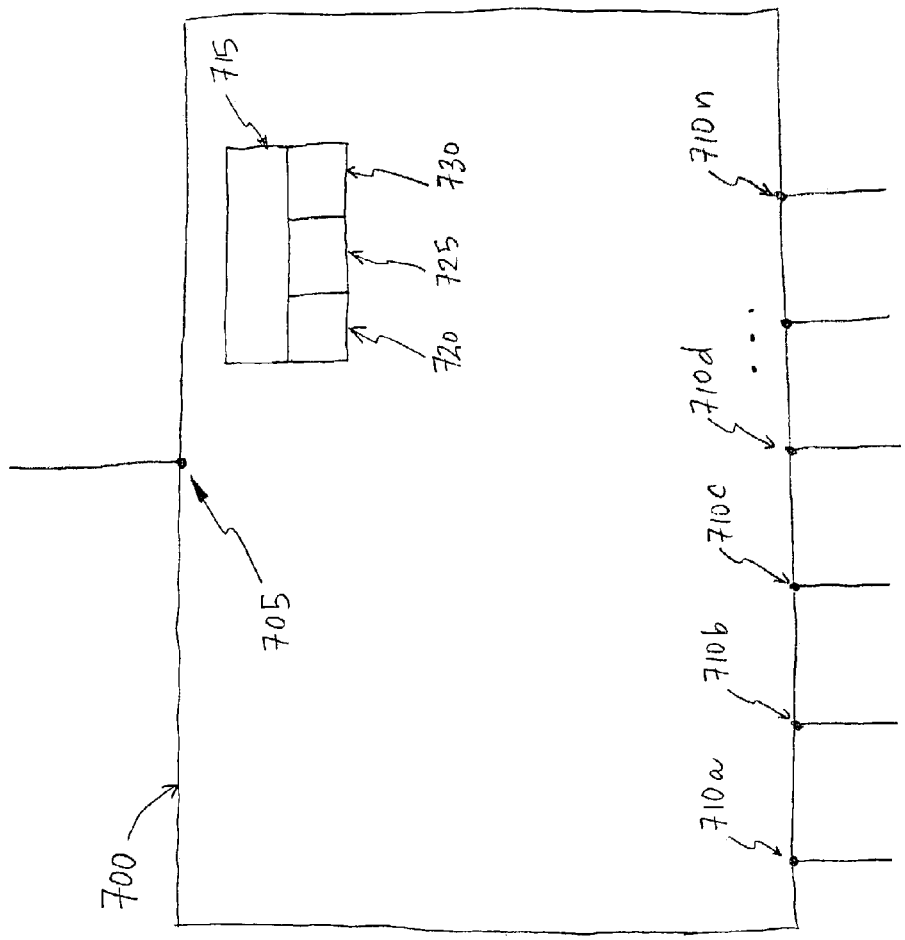
FIG. 7 illustrates another example of a provider edge device in accordance with the present invention.

In addition to the above, FIG. 7 shows another example of a hardware configuration of a PE device 700, such as PE 1, PE 2 . . . PE n. The hardware configuration of FIG. 7 can be in an integrated, modular and single chip solution, and therefore can be embodied on a semiconductor substrate, such as silicon. Alternatively, the hardware configuration of FIG. 7 can be embodied in a plurality of discrete components on a circuit board.

The PE device 700 can be configured to include at least one uplink port 705, and a plurality of customer facing ports or subscriber ports 710*a*, 710*b*, 710*c*, 710*d* . . . 710*n*. As mentioned above, each port within the PE devices can be configured to be a receiving port, or an ingress port, as well as a transmitting port, or an egress port, for receiving and transmitting a packet, respectively.

Furthermore, the PE device 700 can include a default storage unit 715, an enable bit storage unit 720, an always-tagged bit storage unit 725 and an ingress-tagged bit storage unit 730. The storage units 715, 720, 725 and 730 can be memory unit such as registers for storing information therein. Additionally, the storage units 715, 720, 725 and 730 can be associated with the uplink port 705.

The default storage unit 715 can store a default packet tag such as a default SP VLAN tag. The enable bit storage unit 720 can store an enable bit, which either can be set or not set. Additionally, the always-tagged bit storage unit 725 can store an always-tagged bit, and the ingress-tagged bit storage unit 730 can store an ingress-tagged bit. Similarly, the always-tagged bit and the ingress-tagged bit can be set or not set.

Figure 8:
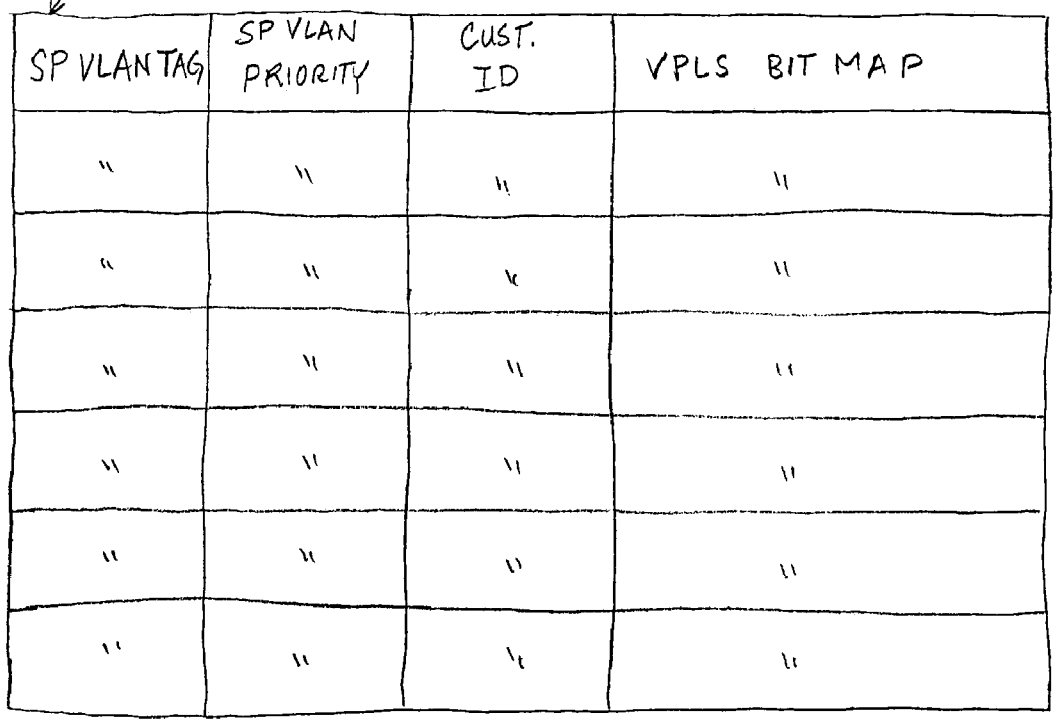
FIG. 8 illustrates a VPLS bit map table according to an embodiment of the invention.

In addition to the features disclosed with respect to FIG. 7, it is noted that the PE device 700 can also include all the features discussed above with respect to PE device as shown in FIG. 3. In particular, the PE device 700 can also include a VPLS bit map table 800 as shown in FIG. 8. The VLPS bit map table 800 can store information such as SP VLAN tag(s), SP VLAN priority(s), CUST ID(s), and VPLS bit map(s). The VPLS bit map table 800 can be indexed by the SP VLAN tag(s).

Figure 10:
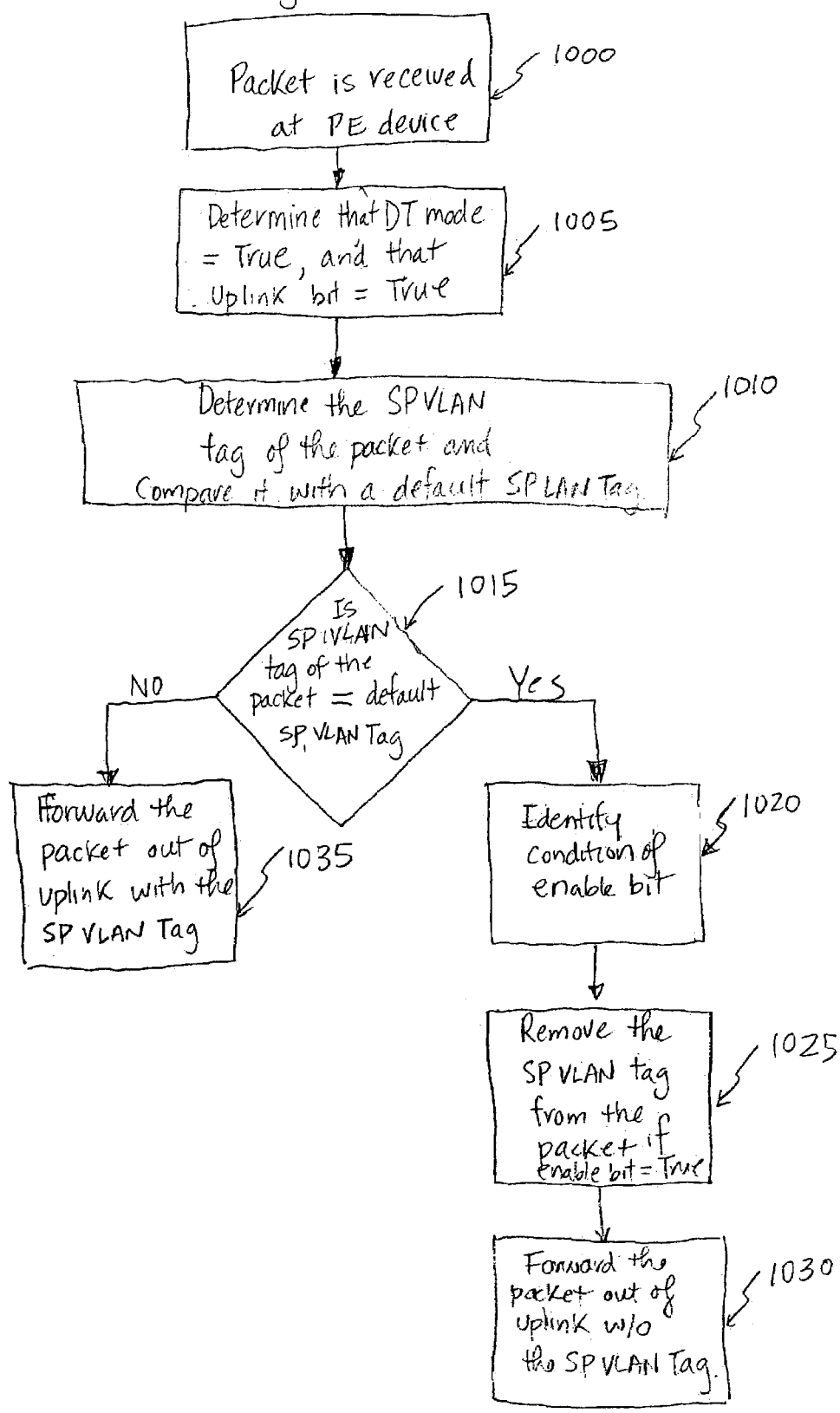
FIG. 10 illustrates an example of a method of processing a packet according to the present invention.

FIG. 10 illustrates one example of a method of processing a packet based on double tagging thereof in accordance with the present invention. The method of the present example can be implemented in hardware, or software, or a combination of both hardware and software.

The example as shown in FIG. 10 can be directed to a method of processing a packet based on double tagging. A packet can be received at a PE device at step 1000. The packet can be received at a customer facing port such as ports 710*a*, 710*b*, 710*c*, 710*d*, . . . 710*n* as shown in FIG. 7. The packet can be appended with a corresponding SP VLAN tag and can be forwarded out of the uplink port to a network destination. Before the packet leaves the uplink port of the PE device, the present invention can determine the condition of the double tagging mode and the condition of the uplink bit. In other words, the present example can determine if the double tagging mode and the uplink bit are set to a condition such as "TRUE" or "1" at step 1005.

If the double tagging mode is set to be "TRUE" and the uplink bit is also set to be "TRUE", then the invention can determine the SP VLAN tag of the packet and compare the SP VLAN tag with a default SP VLAN tag stored within a default SP VLAN tag register at step 1010.

Step 1015 of FIG. 10 provides the step determining whether the SP VLAN tag of the packet matches the default SP VLAN tag. If the SP VLAN tag of the packet matches the default SP VLAN tag stored within the default SP VLAN tag register, then the invention can determine if the enable bit is set to be "True" at step 1020. If the enable bit is set to be "True", then the SP VLAN tag can be removed from the packet at step 1025. Thereafter, the packet without a SP VLAN tag can be forwarded out of the uplink port to a network destination at step 1030. If however, the SP VLAN tag of the packet does not match the default SP VLAN tag stored within the default SP VLAN tag register, then the invention can forward the packet out of the uplink port to a network destination with the SP VLAN tag appended to the packet at step 1035.

Figure 11:
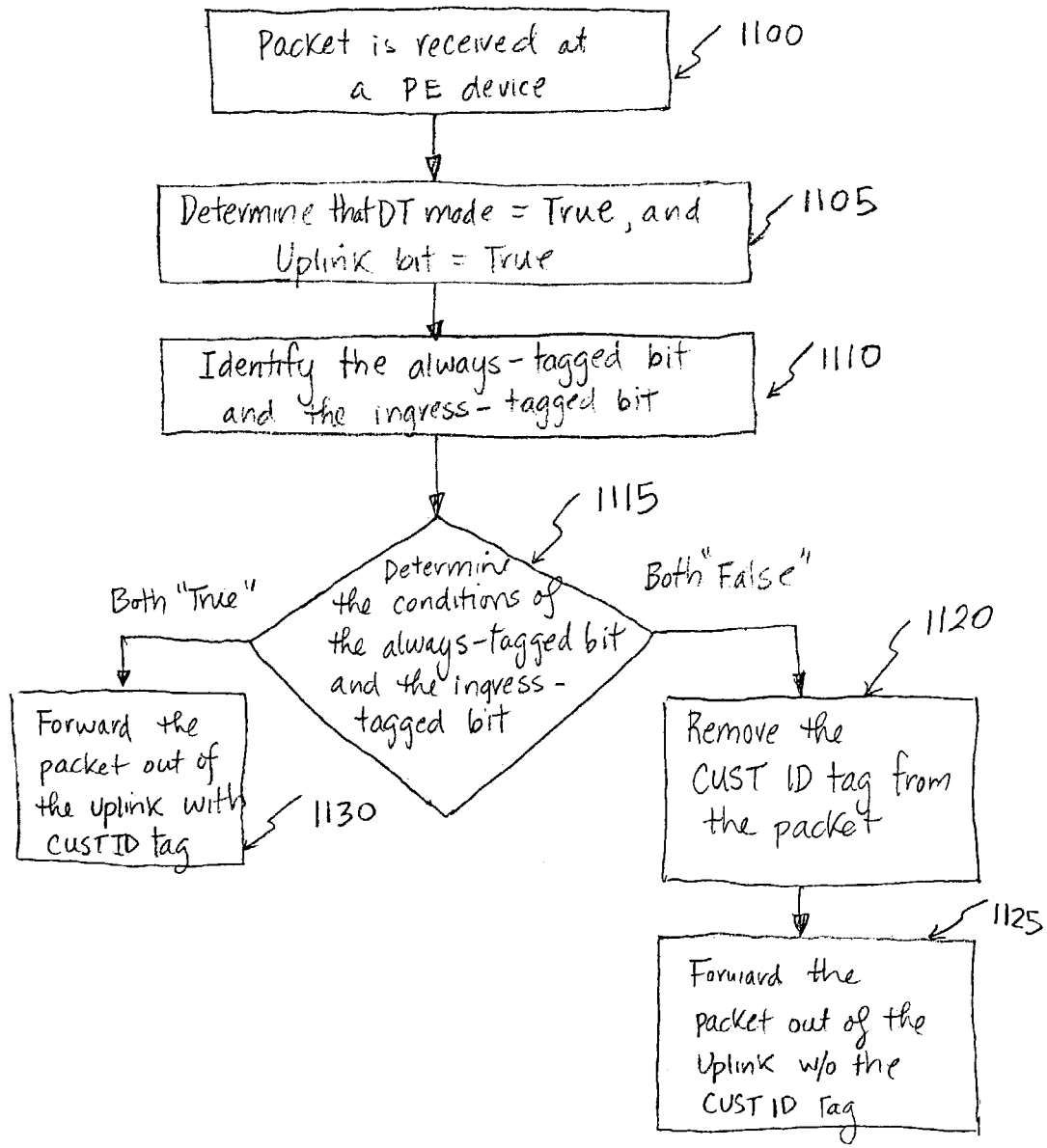
FIG. 11 illustrates another example of a method of processing a packet according to the invention.

FIG. 11 illustrates another example of a method of processing a packet based on double tagging thereof in accordance with the present invention. The method of the present example can be implemented in hardware, or software, or a combination of both hardware and software.

A packet can be received at a PE device at step 1100. The packet can be received at a customer facing port such as ports 710*a*, 710*b*, 710*c*, 710*d*, . . . 710*n* as shown in FIG. 7. The packet can be appended with a corresponding SP VLAN tag and can be forwarded out of the uplink port to a network destination. Before the packet leaves the uplink port of the PE device, the present invention can determine the condition of the double tagging mode and the condition of the uplink bit. In other words, the present example can determine if the double tagging mode and the uplink bit are set to a condition such as "TRUE" or "1" at step 1105.

If the both the conditions of double tagging mode and the uplink bit are set to be "True", then the present invention can identify an always-tagged bit stored within an always-tagged bit register, and can identify an ingress-tagged bit stored within an ingress-tagged bit register at step 1110. Once the always-tagged bit and the ingress-tagged bit are identified, the conditions of each of these bits can be determined at step 1115. If it is determined that the condition of the always-tagged bit is set to be "FALSE" or "0", and if it is determined that the condition of the ingress-tagged bit is also set to be "FALSE" or "0", then present invention can remove the CUST ID tag from the packet at step 1120. Thereafter, the packet without a CUST ID tag can be forwarded out of the uplink port to a network destination at step 1125.

However, if it is determined that the condition of the always-tagged bit is set to be "TRUE" or "1", and if it is determined that the condition of the ingress-tagged bit is also set to be "TRUE" or "1", then present invention can forward the packet out of the uplink port to a network destination with the CUST ID tag remaining in the packet at step 1130.

Figure 12:
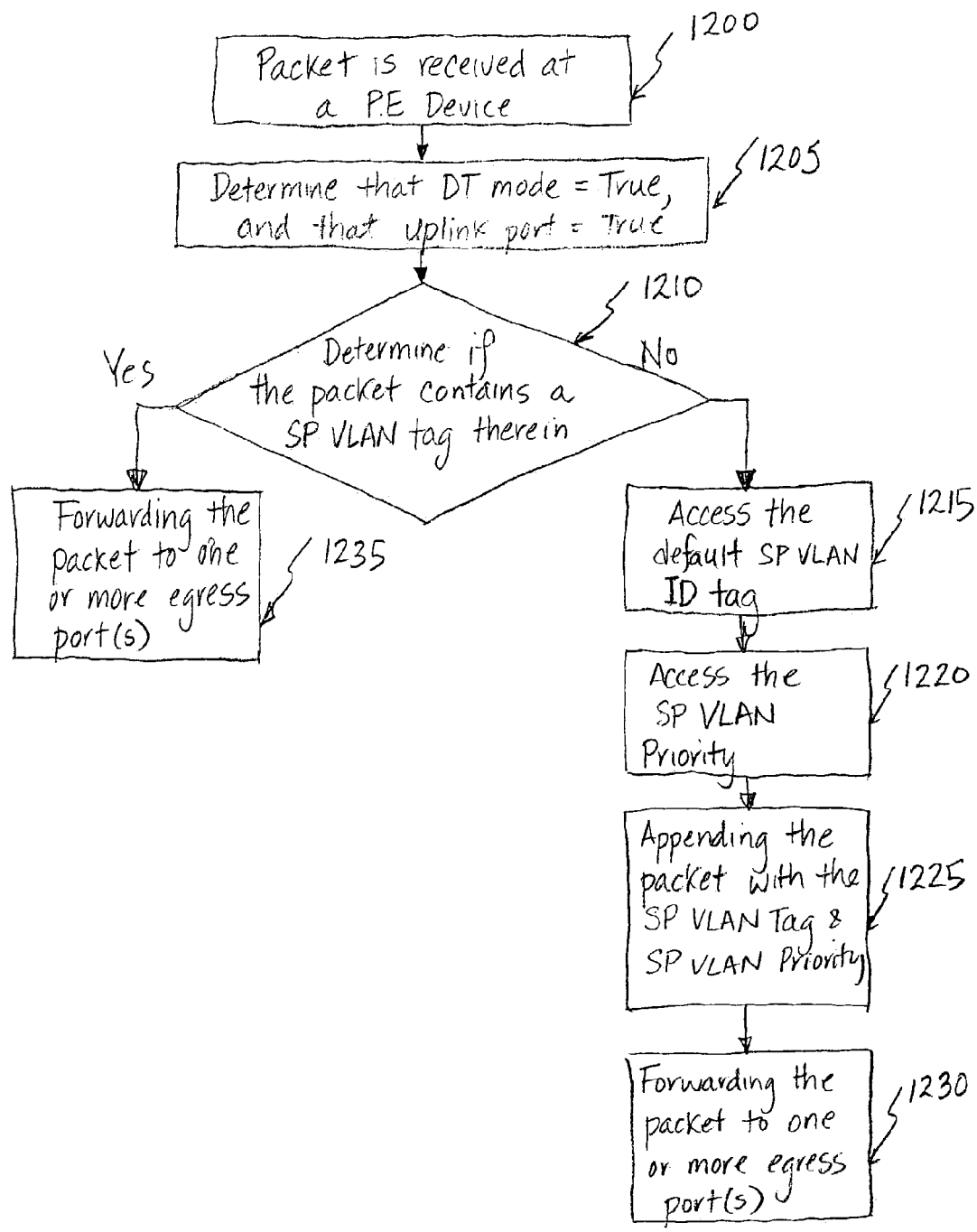
FIG. 12 illustrates another example of a method of processing a packet according to the invention.

FIG. 12 illustrates yet another example of a method of processing a packet based on double tagging thereof in accordance with the present invention. The method of the present example can be implemented in hardware, or software, or a combination of both hardware and software.

A packet can be received at a PE device at step 1200 of FIG. 12. In particular, a packet can be received at an uplink port such as uplink port 705 of FIG. 7. After the packet is received, the present invention can determine if the packet was received at an uplink port and can determine whether the PE device is set for double tagging mode at step 1205. In other words, the invention can determine if the conditions set for double tagging mode and for the uplink bit are both "TRUE" or "1". If both conditions are set as "TRUE", then this can indicate that the PE device is operating under double tagging mode, and that the port in which the packet is received is an uplink port.

Once the packet is received at the uplink port, the packet is checked to determine if the packet contains a SP VLAN tag therein at step 1210. If it is determined that the packet received does not contain a SP VLAN tag therein, then the invention can access the default SP VLAN tag stored within the default SP VLAN tag register at step 1215. The SP VLAN tag register can be associated with the uplink port. Additionally, the SP VLAN priority can be obtained or access at step 1220. The SP VLAN priority can be accessed by indexing the default SP VLAN tag to a VPLS bit map table such as the one shown in FIG. 8. The VPLS bit map table 800 can contain information such as the SP VLAN tag, the SP VLAN priority, the CUST ID, and VPLS bit map.

Once the default SP VLAN tag and the SP VLAN priority are both accessed, the packet received at the uplink port can thereby be appended with the default SP VLAN tag and the SP VLAN priority at step 1225. FIG. 9 shows one example of a packet 901 appended with the default SP VLAN tag and the SP VLAN priority. Thereafter, the packet appended with the default SP VLAN tag and the SP VLAN priority can be processed based on the examples discussed above, and can be forwarded to one or more egress port(s) for further processing at step 1230.

However, if the packet received at the uplink port is checked and is determined to contain a SP VLAN tag, the packet can be processed based on the examples provided above, and can be forwarded to one or more egress port(s) for further processing at step 1235.

Figure 13:
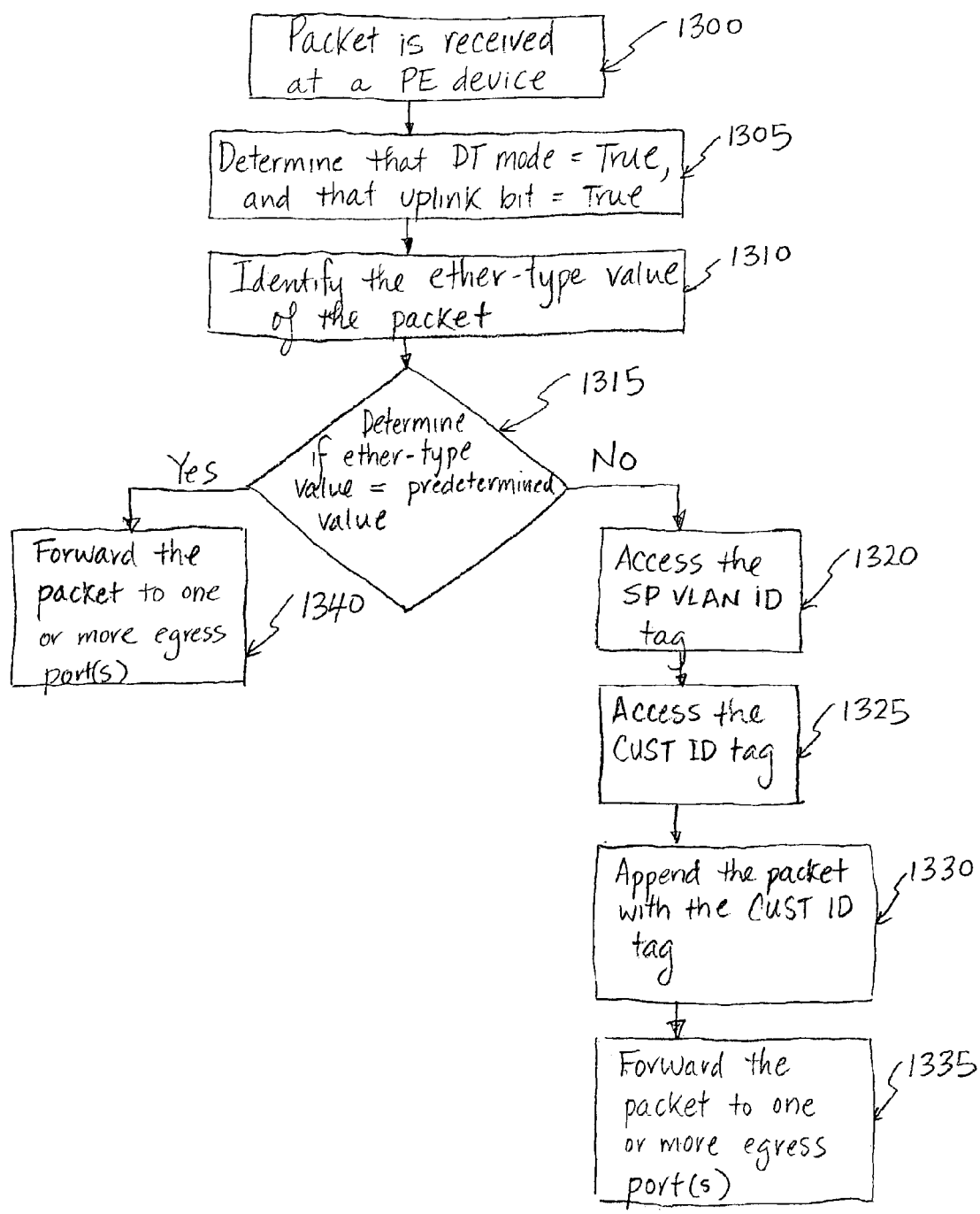
FIG. 13 illustrates another example of a method of processing a packet according to the invention.

FIG. 13 illustrates yet another example of a method of processing a packet based on double tagging thereof in accordance with the present invention. The method of the present example can be implemented in hardware, or software, or a combination of both hardware and software.

A packet can be received at a PE device at step 1300 of FIG. 13. In particular, a packet can be received at an uplink port such as uplink port 705 of FIG. 7. After the packet is received, the present invention can determine if the packet was received at an uplink port and can determine whether the PE device is set for double tagging mode at step 1305. In other words, the invention can determine if the conditions set for double tagging mode and for the uplink bit are both "TRUE" or "1". If both conditions are set as "TRUE", then this can indicate that the PE device is operating under double tagging mode, and that the port in which the packet is received is an uplink port.

Once the packet is received at the uplink port, a ether-type value embedded within the packet is identified at step 1310, and the ether-type value can be checked to determine if the ether-type value matches a predetermined value such as "08100" at step 1315. The ether-type value can be a 16-bit value. The ether-type value can also indicate whether a packet received at a PE device contains a CUST ID tag. If it is determined that the ether-type value within the packet received does not match a predetermined value such as "08100", then this can indicate that the packet received does not contain a CUST ID tag therein. Thus, the invention can access the SP VLAN tag from the packet received at step 1320. Moreover, the invention can access the SP VLAN tag from the default SP VLAN tag register if the SP VLAN tag is not within the packet as discussed above with respect to FIG. 12. Thereafter, the CUST ID tag can be accessed by indexing the SP VLAN tag to a VPLS bit map table such as the one shown in FIG. 8. The VPLS bit map table 800 can contain information such as the SP VLAN tag, the SP VLAN priority, the CUST ID tag, and VPLS bit map.

Once the CUST ID tag is accessed, the packet received at the uplink port can thereby be appended with the CUST ID tag at step 1330. FIG. 9 shows one example of a packet 900 having an ether-type value therein along with a SP VLAN tag, a CUST ID tag. Thereafter, the packet appended with the CUST ID tag can be processed based on the examples discussed above, and can be forwarded to one or more egress port(s) for further processing at step 1335.

However, if the ether-type value within the packet received is identified and the ether-type value is determined to match a predetermined value such as "08100", then this can indicate that the packet contains a CUST ID tag therein. Thus, the packet can be processed based on the examples provided above, and can be forwarded to one or more egress port(s) for further processing at step 1340.

The above-disclosed system configurations of the present invention can be embodied within a Virtual Private LAN Service (VPLS), a Transparent LAN Service (TLS), a Virtual Private Switched Network Service (VPSNS), or any Layer 2 Virtual Private Network (VPN). In addition, the above-disclosed hardware configuration can be embodied in a semiconductor substrate, such as silicon. Furthermore, the methods of the invention can be implemented in hardware, or software, or a combination of both hardware and software. In addition, a person of skill in the art with respect to network system design and/or semiconductor design and manufacturing would be able to implement the various network systems, elements and methods of the present invention onto a single system or onto a single semiconductor substrate, respectively, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for processing a packet in a communications network, said method comprising the steps of:
  receiving a packet in an ingress port within a network component;
  accessing a packet tag corresponding to the packet, wherein the step of accessing the packet tag comprises identifying an uplink bit stored within the ingress port;
  identifying a membership port bit map based on the packet tag;
  identifying an outgoing port bit map based on the packet, wherein the step of the identifying an outgoing port bit map comprises identifying a destination address within the packet if the packet received is a known packet and identifying a customer identification within the packet;
  generating an egress port bit map based on the membership port bit map and the outgoing port bit map; and
  transmitting the packet out of at least one egress port corresponding to the egress port bit map.

2. The method of claim 1, wherein the step of accessing the packet tag comprises the steps of:
  accessing the packet tag from within the ingress port in which the packet was received when the uplink bit is not set; and
  accessing the packet tag from within the packet when the uplink bit is set.

3. The method of claim 1, wherein the step of identifying the membership port bit map comprises the step of:
  indexing the packet tag into a membership port bit map table.

4. The method of claim 1, wherein the step of generating the egress port bit map comprises the step of:
  comparing the membership port bit map with the outgoing port bit map by implementing a logical AND operation.

5. The method of claim 1, wherein the step of accessing the packet tag comprises the steps of:
  accessing a default packet tag stored within a default storage unit.

6. The method of claim 5, further comprising the steps of:
  identifying an uplink bit stored within the ingress port;
  identifying a default priority tag corresponding to the default packet tag; and appending the packet with the default packet tag and with the default priority tag when the uplink bit is set and when the packet received does not contain the packet tag.

7. A method for processing a packet in a communications network, said method comprising the steps of:
receiving a packet in an ingress port within a network component;
accessing a packet tag corresponding to the packet, wherein the step of accessing the packet tag comprises identifying an uplink bit stored within the ingress port;
identifying a membership port bit map based on the packet tag;
identifying an outgoing port bit map based on the packet, wherein the step of the identifying an outgoing port bit map comprises identifying a customer identification within the packet;
generating an egress port bit map based on the membership port bit map and the outgoing port bit map; and
transmitting the packet out of at least one egress port corresponding to the egress port bit map,
wherein the step of identifying the outgoing port bit map comprises the steps of:
identifying a destination address within the packet;
searching a first look-up table when the destination address comprises a unicast destination address, wherein searching the first look-up table is based on the unicast destination address and the customer identification; and
searching a second look-up table when the destination address comprises a multicast destination address, wherein searching the second look-up table is based on the multicast destination address and the customer identification.

8. A method for processing a packet in a communications network, said method comprising the steps of:
receiving a packet in an ingress port within a network component;
accessing a packet tag corresponding to the packet, wherein the step of accessing the packet tag comprises identifying an uplink bit stored within the ingress port;
identifying a membership port bit map based on the packet tag;
identifying an outgoing port bit map based on the packet, wherein the step of the identifying an outgoing port bit map comprises identifying a customer identification within the packet;
generating an egress port bit map based on the membership port bit map and the outgoing port bit map; and
transmitting the packet out of at least one egress port corresponding to the egress port bit map,
wherein the step of identifying the outgoing port bit map comprises:
indexing the customer identification into a look-up table.

9. A method for processing a packet in a communications network, said method comprising the steps of:
receiving a packet in an ingress port within a network component;
accessing a packet tag corresponding to the packet, wherein the step of accessing the packet tag comprises identifying an uplink bit stored within the ingress port;
identifying a membership port bit map based on the packet tag;
identifying an outgoing port bit map based on the packet, wherein the step of the identifying an outgoing port bit map comprises identifying a customer identification within the packet;
generating an egress port bit map based on the membership port bit map and the outgoing port bit map; and
transmitting the packet out of at least one egress port corresponding to the egress port bit map,
wherein the step of transmitting the packet comprises the steps of:
identifying an uplink bit stored within the at least one egress port;
appending the packet with the packet tag when the uplink bit is set; and
removing the packet tag from the packet when the uplink bit is not set.

10. The method of claim 9, further comprising the steps of:
identifying a default packet tag stored within a default storage unit;
identifying an enable bit; and
removing the packet tag from the packet when the default packet tag stored within the default storage unit matches the packet tag and when the enable bit is set.

11. The method of claim 9, further comprising the steps of:
identifying an always-tagged bit;
identifying an ingress-tagged bit; and
removing a customer identifier tag from the packet when the always-tagged bit is not set and when the ingress-tagged bit is not set.

12. A network device for processing a packet, said network device comprising:
an ingress port configured to receive a packet, wherein the ingress port comprises a second storage unit configured to store an uplink bit;
a membership port bit map table configured to store at least one membership port bit map;
an outgoing port bit map table configured to store at least one outgoing port bit map;
a first storage unit configured to store an egress port bit map, wherein the egress port bit map is based on the membership port bit map and the outgoing port bit map; and
at least one egress port configured to transmit out the packet, wherein the at least one egress port corresponds to the egress port bit map,
wherein the outgoing port bit map table comprises a first look-up table when the packet includes a unicast destination address and a customer identification, and
wherein the outgoing port bit map table comprises a second look-up table when the packet includes a multicast destination address and the customer identification.

13. The network device of claim 12, wherein a packet tag is accessed from within the ingress port when the uplink bit is not set, and wherein the packet tag is accessed from within the packet when the uplink bit is set.

14. The network device of claim 13, wherein the membership port bit map table is indexed by the packet tag to identify the membership port bit map corresponding to the packet.

15. The network device of claim 12, wherein the first storage unit is configured to store the egress port bit map, and wherein the egress port bit map is based on a logical AND'ing of the membership port bit map with the outgoing port bit map.

16. The network device of claim 12, wherein the at least one egress port includes:
a second storage unit configured to store an uplink bit, wherein the packet is appended with a packet tag when the uplink bit is set, and wherein the packet tag is removed from the packet when the uplink bit is not set.

17. The network device of claim 16, further comprising:
a third storage unit configured to store a default packet tag;

a fourth storage unit configured to store an enable bit; and
a removing unit configured to remove the packet tag from the packet when the default packet stored within the third storage unit matches the packet tag, and when the enable bit stored within the fourth storage unit is set.

18. The network device of claim 16, further comprising:
a third storage unit configured to store an always-tagged bit;
a fourth storage unit configured to store an ingress-tagged bit; and
a removing unit configured to remove a customer identifier tag from the packet when the always-tagged bit stored within the third storage unit is not set and when the ingress-tagged bit stored within the fourth storage unit is not set.

19. The network device of claim 12, further comprising:
a default packet storage unit configured to store a default packet tag;
an uplink storage unit configured to store an uplink bit;
a default priority storage unit configured to store a default priority tag
an appending unit configured to append the packet with the default packet tag stored within the default packet storage unit and with the default priority tag stored within the default priority storage unit when the uplink bit within the uplink storage unit is set and when the packet received does not contain a packet tag.

20. A network device for processing a packet, said network device comprising:
an ingress port configured to receive a packet, wherein the ingress port comprises a second storage unit configured to store an uplink bit;
a membership port bit map table configured to store at least one membership port bit map;
an outgoing port bit map table configured to store at least one outgoing port bit map;
a first storage unit configured to store an egress port bit map, wherein the egress port bit map is based on the membership port bit map and the outgoing port bit map; and
at least one egress port configured to transmit out the packet, wherein the at least one egress port corresponds to the egress port bit map,
wherein the outgoing port bit map table comprises a first look-up table when the packet includes a unicast destination address and a customer identification,
wherein the first look-up table is searched using the unicast destination address and the customer identification to identify the outgoing port bit map, and wherein the outgoing port bit map table comprises a second look-up table when the packet includes a multicast destination address and the customer identification, wherein the second look-up table is searched using the multicast destination address and the customer identification to identify the outgoing port bit map.

21. A network device for processing a packet, said network device comprising:
an ingress port configured to receive a packet, wherein the ingress port comprises a second storage unit configured to store an uplink bit;
a membership port bit map table configured to store at least one membership port bit map;
an outgoing port bit map table configured to store at least one outgoing port bit map;
a first storage unit configured to store an egress port bit map, wherein the egress port bit map is based on the membership port bit map and the outgoing port bit map; and
at least one egress port configured to transmit out the packet, wherein the at least one egress port corresponds to the egress port bit map,
wherein the outgoing port bit map table comprises a first look-up table when the packet includes a unicast destination address and a customer identification, wherein the outgoing port bit map table comprises a look-up table when the packet includes a customer identification, and wherein the look-up table is indexed by the customer identification to identify the outgoing port bit map.

22. A system for processing a packet in a communication network, said system comprising:
a receiving means for receiving a packet in an ingress port within a network component;
a first accessing means for accessing a packet tag corresponding to the packet,
wherein the first accessing means comprises a third identifying means for identifying an uplink bit stored within the ingress port;
a first identifying means for identifying a membership port bit map based on the packet tag;
a second identifying means for identifying an outgoing port bit map based on the packet, wherein the second identifying means comprises a fourth identifying means for identifying a destination address within the packet when the packet received is a known packet and for identifying a customer identification within the packet;
a generating means for generating an egress port bit map based on the membership port bit map and the outgoing port bit map; and
a transmitting means for transmitting the packet out of at least one egress port corresponding to the egress port bit map.

23. The system of claim 22, wherein the first accessing means comprises of:
a second accessing means for accessing the packet tag from within the ingress port in which the packet was received when the uplink bit is not set; and
a third accessing means for accessing the packet tag from within the packet when the uplink bit is set.

24. The system of claim 23, wherein the first identifying means for identifying the membership port bit map comprises of:
an indexing means for indexing the packet tag into a membership port bit map table.

25. The system of claim 22, wherein the second identifying means for identifying the outgoing port bit map comprises of:
a first searching means for searching a first look-up table when the destination address comprises a unicast destination address, wherein searching the first look-up table is based on the unicast destination address and the customer identification; and
a second searching means for searching a second look-up table when the destination address comprises a multicast destination address, wherein searching the second look-up table is based on the multicast destination address and the customer identification.

26. The system of claim 22, wherein the second identifying means for identifying the outgoing port bit map comprises of:
a third identifying means for identifying a customer identification within the packet; and
an indexing means for indexing the customer identification into a look-up table.

27. The system of claim 22, wherein the generating means comprises of:
a comparing means for comparing the membership port bit map with the outgoing port bit map by implementing a logical AND operation.

28. The system of claim 22, wherein the transmitting means comprises of:
a third identifying means for identifying an uplink bit stored within the at least one egress port;
an appending means for appending the packet with the packet tag when the uplink bit is set; and
a first removing means for removing the packet tag from the packet when the uplink bit is not set.

29. The system of claim 28, further comprising:
a fourth identifying means for identifying a default packet tag stored within a default storage unit;
a fifth identifying means for identifying an enable bit; and
a second removing means for removing the packet tag from the packet when the default packet tag stored within the default storage unit matches the packet tag and when the enable bit is set.

30. The system of claim 28, further comprising:
a fourth identifying means for identifying an always-tagged bit;
a fifth identifying means for identifying an ingress-tagged bit; and
a second removing means for removing a customer identifier tag from the packet when the always-tagged bit is not set and when the ingress-tagged bit is not set.

31. The system of claim 22, wherein the first accessing means accesses a default packet tag stored within a default storage unit.

32. The system of claim 31, further comprising:
a third identifying means for identifying an uplink bit stored within the ingress port;
a fifth identifying means for identifying a default priority tag corresponding to the default packet tag; and
an appending means for appending the packet with the default packet tag and with the default priority tag when the uplink bit is set and when the packet received does not contain the packet tag.

33. The system of claim 22, further comprising:
a third identifying means for identifying an uplink bit stored within the ingress port;
a fourth identifying means for identifying an ether-type value within the packet received; and
an appending means for appending the packet with a customer identifier tag when the uplink bit is set and when the ether-type value matches a predetermined value.

34. The system of claim 33, wherein the first identifying means comprises:
an indexing means for indexing the packet tag into a membership port bit map table;
a fifth identifying means for identifying the customer identifier tag within the membership port bit map table, wherein the customer identifier tag correspond to the packet tag.

35. A method for processing a packet in a communications network, said method comprising the steps of:
receiving a packet in an ingress port within a network component;
accessing a packet tag corresponding to the packet, wherein the step of accessing the packet tag comprises identifying an uplink bit stored within the ingress port;
identifying a membership port bit map based on the packet tag;
identifying an outgoing port bit map based on the packet, wherein the step of the identifying an outgoing port bit map comprises identifying a customer identification within the packet;
generating an egress port bit map based on the membership port bit map and the outgoing port bit map;
transmitting the packet out of at least one egress port corresponding to the egress port bit map;
identifying an uplink bit stored within the ingress port;
identifying an ether-type value within the packet received; and
appending the packet with a customer identifier tag when the uplink bit is set and when the ether-type value matches a predetermined value.

36. The method of claim 35, wherein the step of identifying the membership port bit map comprises the steps of:
indexing the packet tag into a membership port bit map table;
identifying the customer identifier tag within the membership port bit map table, wherein the customer identifier tag correspond to the packet tag.

37. A method for processing a packet in a communications network, said method comprising the steps of:
receiving a packet in an ingress port within a network component;
accessing a packet tag corresponding to the packet, wherein the step of accessing the packet tag comprises identifying an uplink bit stored within the ingress port;
identifying a membership port bit map based on the packet tag;
identifying an outgoing port bit map based on the packet, wherein the step of the identifying an outgoing port bit map comprises identifying a customer identification within the packet;
generating an egress port bit map based on the membership port bit map and the outgoing port bit map;
transmitting the packet out of at least one egress port corresponding to the egress port bit map;
an uplink storage unit configured to store an uplink bit;
determining unit configured to determine an ether-type value with the packet received; and
an appending unit configured to append the packet with a customer identifier tag when the uplink bit stored within the uplink storage unit is set and when the ether-type value determined by the determining unit matches a predetermined value.

38. The network device of claim 37, wherein the membership port bit map table is configured to store the customer identification tag.

* * * * *